UNITED STATES PATENT OFFICE.

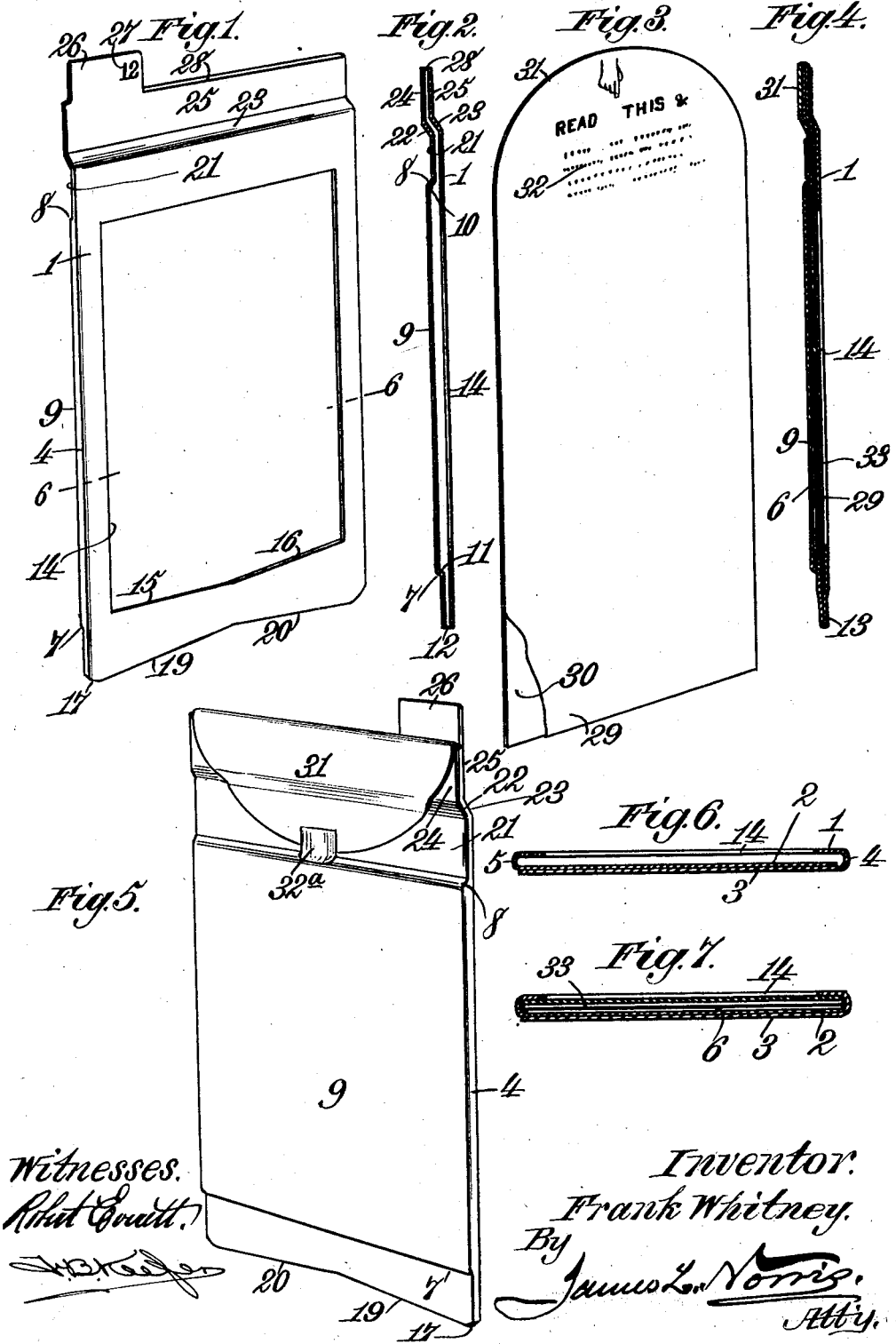

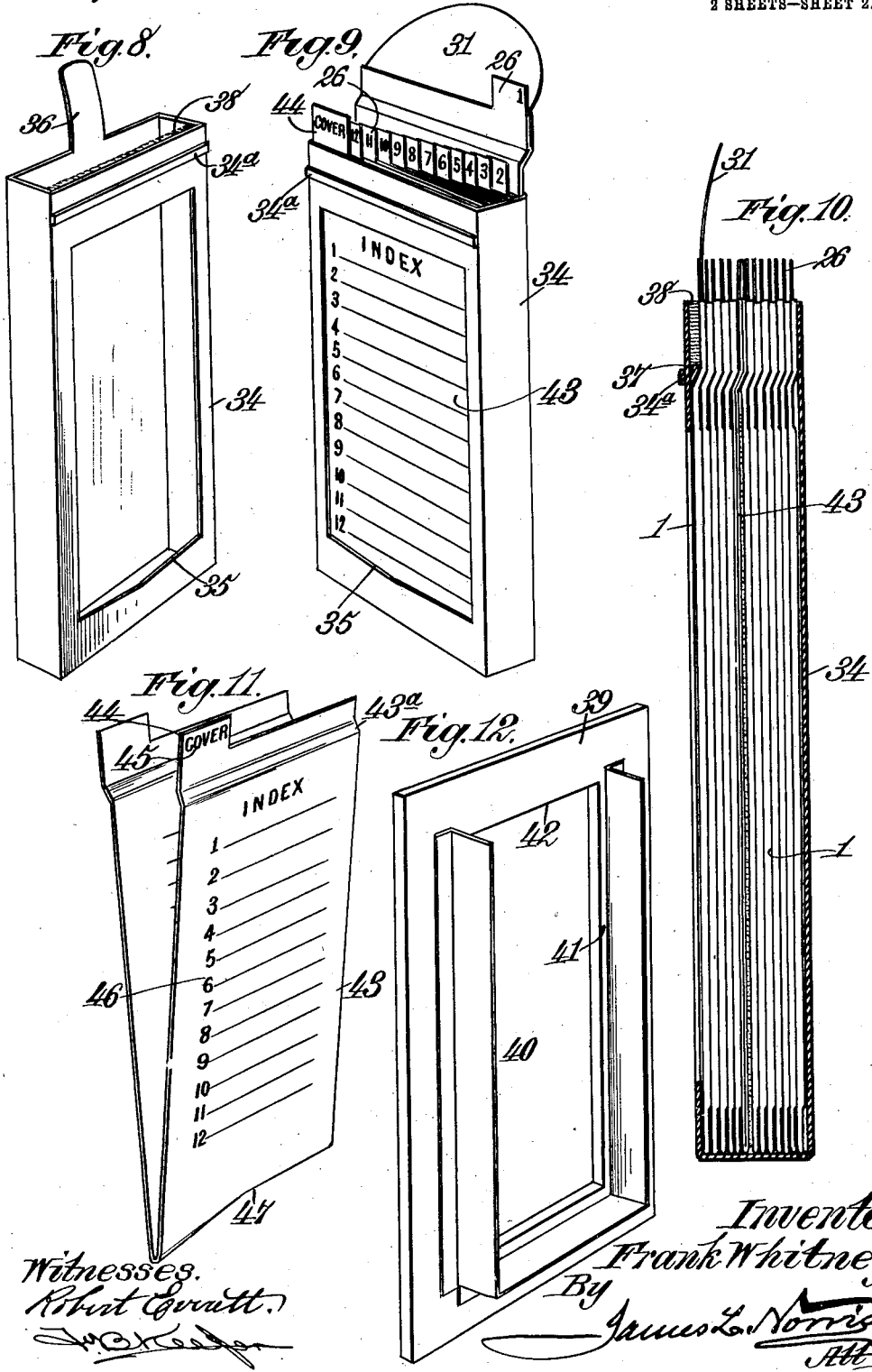

FRANK WHITNEY, OF LAKESIDE, ILLINOIS.

PHOTOGRAPHIC PLATE OR FILM HOLDER.

937,129.  Specification of Letters Patent.  Patented Oct. 19, 1909.

Application filed March 13, 1907. Serial No. 362,219.

*To all whom it may concern:*

Be it known that I, FRANK WHITNEY, a citizen of the United States, residing at Lakeside, in the county of Cook and State of Illinois, have invented new and useful Improvements in Photographic Plate or Film Holders, of which the following is a specification.

This invention relates to photographic plate or film holders, or other sensitized coated bases employed in cameras; and one of the objects thereof is to provide, in a manner as hereinafter set forth, holders which can be used individually or collectively. Individually, each holder is an originally sealed light-proof package, and when the holders are used collectively with a casing they form what is termed a magazine plate or film holder and present to the manufacturer, dealer and consumer a safe, clean and economical system of handling photographic plates or films or other sensitized coated bases, and further combining other features and advantages hereinafter more specifically referred to, all leading to concentration in photography of facilities necessary to perfection in the art.

A further object of the invention is to provide the holder with means, in a manner as hereinafter set forth, to protect the plate or film from dampness, gas or other injurious substances, or to construct the holder from a wax or otherwise prepared material for accomplishing the result stated.

A further object of the invention is to construct the holder with an opening at its bottom for the introduction of the plate or film, the opening to be closed and sealed light-tight after the positioning of the plate or film, the said seal being such that it must be broken in order to remove the plate or film.

A further object of the invention is to provide the holder with an impervious coated lining, the coating being in direct and full contact with the back of the plate or film, and to provide the holder with a dark slide which is so positioned as to be in front of the face of the plate or film. This will exclude moisture and gases and furthermore compression will prevent the film from curling or buckling, when in the package.

A further object of the invention is to form the holder near its top with a substantially concavo-convex portion so that when a number of holders are arranged in a package the holders will interlock, one with the other and thereby combine with each other to prevent the slipping of one past the other, said portion further constituting a means to prevent too free passage of the dark slide.

A further object of the invention is to provide a casing for a plurality of the light-tight individual holders, said casing embodying an offset adapted to interlock with a concavo-convex portion of one holder, thereby preventing the holders from sliding lengthwise out of the casing unless forcibly drawn therefrom.

A further object of the invention is to provide at the mouth of the casing a plush lining or brush adapted to exclude the entrance of all dust or other foreign matter when positioning the plate holder within the casing, the said plush lining or brush also serving to exclude light from entering the casing around the holders in view of the fact that the holders are in close contact with the brush.

A further object of the invention is to provide each holder with a visible indicator projecting prominently to show positively that the plate or film in position for action has not been exposed, said indicator being dispensed with after the plate has been exposed.

A further object of the invention is to provide each of the holders with a dark slide or blind formed from a plurality of leaves of a minimum thickness which will act as a safe-guard to the plate or film in case of imperfection in either one of the leaves.

A further object of the invention is to provide the holder with a dark slide or blind of substantially the same focal plane as the plate or film and to be used as a focusing screen instead of a ground glass in all cameras where a peep-hole is provided for the purpose.

A further object of the invention is to provide a package of interchangeable holders, each constructed of an even thickness of material in that space surrounding the edge of the plate or film so that when a number of said holders containing plates or films are arranged in the package and compressed in close contact, the exposure opening edge will form a light-tight seal, as such edge is thicker.

A further object of the invention is to provide an auxiliary front for the magazine package and with which the package is readily adapted to a different shape or larger camera. This auxiliary front may be attached in a well known manner.

A further object of the invention is to provide the holder with a transparent color screen in front of the plate or film to correct certain color values during the exposure of an orthochromatic plate.

A further object of the invention is to provide the magazine casing with a deflecting light strip which may be used also for interlocking with the camera, and further to provide the casing with means to allow the convenient removal of the casing from the camera.

A further object of the invention is to so construct the lower edge of the exposure opening in the casing as to permit the free passage of a holder along the inner face of the casing without catching on the lower edge of the exposure opening.

A further object of the invention is to so construct the bottom edge of the holder, the bottom edge of the exposure opening of the holder and the bottom edge of the exposure opening of the casing, so as to pass each other in a manner similar to the blades of a pair of shears.

With the foregoing and other objects in view, the invention consists of the novel construction, combination and arrangement of parts hereinafter more specifically described and illustrated in the accompanying drawings, wherein is shown the preferred embodiment of a holder, casing and front in accordance with this invention, but it will be understood that changes, variations and modifications can be resorted to which come within the scope of the claims hereunto appended.

In the drawings wherein like reference characters denote corresponding parts throughout the several views—Figure 1 is a perspective view of a holder in accordance with this invention. Fig. 2 is a vertical sectional view. Fig. 3 is a view of the dark slide. Fig. 4 is a vertical sectional view of the holder with a plate arranged therein. Fig. 5 is a rear view of the holder. Fig. 6 is a section on line 6—6 of Fig. 1. Fig. 7 is a like view with a plate in the holder. Fig. 8 is a perspective view of the casing. Fig. 9 is a perspective view of the package. Fig. 10 is a vertical sectional view of the package. Fig. 11 is a view showing the index card. Fig. 12 is a perspective view of the front.

The word "plate", hereinafter referred to, is used generically for a plate, film or other sensitized coated base. The holder will be hereinafter referred to as an "envelop".

The envelop is constructed of a strip of paper or other suitable material, bent in such a manner as to form a front fold 1, a pair of rear folds 2, 3 and a pair of side folds 4, 5, the folds 2, 3 being suitably secured together. By such an arrangement an envelop is formed of three thicknesses of material with the two side folds of equal width disposed the same distances from each other and from the ends of the material thereby providing end folds of equal width which overlap each other and the front fold. This forms an envelop of even thickness. The side folds 4, 5 should be the same distance apart as the width of any plate 6, which it is desired to inclose and consequently such arrangement will prevent the side shifting of the plate 6 in the envelop. The envelop may be termed a resilient one owing to the natural tendency of the folds of the envelop to spring open. The rear of the envelop at a distance apart equal to the length of the plate 6, is crimped, as at 7, 8, forming thereby a pocket 9 for the reception of the plate 6. The shoulders 10 and 11 formed by the crimps 7, 8 when the plate 6 is pocketed, will prevent any lengthwise shifting of the plate 6 in the envelop. The plate 6 is inserted in the envelop up through the opening 12 at the bottom thereof and after the plate 6 has been pocketed the opening 12 is sealed light-tight as indicated at 13 (Fig. 4). After the folds of the envelop are pasted an exposure opening 14 is cut in the fold 1 with the lower edge of said opening extending downwardly and then upwardly at an inclination, as at 15, 16 to form a concave edge. The lower corners of the envelop are clipped off, as at 17, in a beveled-like manner and which facilitates the passage of one edge past another edge when manipulating a package.

The bottom edge of the envelop has a portion extending upwardly at an inclination, as at 19, and the remaining portion downwardly at an inclination, as at 20, forming a concave outline. By providing the crimp 8 in the back of the envelop a portion 21 is formed which is arranged in close proximity with the fold 1. The portion 21 terminates in a rearwardly-extending inclined portion 22, and opposing said portion 22 is a rearwardly-extending inclined portion 23 formed in the fold 1 near the top thereof. The inclined portions 22, 23 terminate, respectively, in straight portions 24, 25. The portion 25 terminates in a tab 26, upon which is an index number 27. The tab 26 also constitutes a finger-piece to allow of the convenient handling of the envelop. The straight portions 24, 25 form the mouth 28 of the envelop. The crimp 8 extends forwardly and upwardly at an inclination and in connection with the portion 22 provides the upper part of the back of the envelop with what may be termed a substantially concavo-convex depressed portion or pocket receiving portion 23 when engaging with an adjacent envelop. This arrangement locks the envelops together or in other words the said inclined portions 22, 23 form inter-engaging or interlocking portions when a plurality of envelops is packed, and constitute locks to prevent the slipping of one envelop past the other. (See Fig. 10.)

The dark slide consists of a plurality of leaves of material indicated by the reference characters 29, 30, the inner leaf 30 being wax-coated. By providing the dark slide with a plurality of leaves it offers a guard against any imperfection in either leaf. It also admits of the desired flexibility necessary to the indirect slide-way 30ª formed by the substantially concavo-convex part of the envelop. The face of the outer leaf is white or light-colored so as to be used as a focusing screen. The leaf 29 terminates in a flap 31 which is particularly adapted as a signal means to show if the plate in position for exposure has been exposed, that is, if the flap is standing, it is positive evidence that the plate is ready for action and is not uncovered. After the plate has been exposed the flap is absent, and owing to such absence is positive evidence that the plate has been exposed to the lens. In fact the plate could not be exposed unless the dark slide is removed, as the flap and slide are unitary, the removal of the slide will cause the removal of the flap. Upon the flap 31 an inscription 32 is printed in a prominent manner, such inscription being instructions which would prove of value to an amateur. A color screen 33 is positioned in each of the envelops at the front of the plate.

The reference character 34 denotes a casing or carton having an exposure opening with the lower edge of said opening formed at an inclination, as at 35. A thumb-piece 36 is provided on the rear wall of the casing at the top to facilitate the handling of the casing. The casing 34 is adapted to receive a plurality of the envelopes (for example as shown in Figs. 9 and 10) and when a plurality of envelops filled with plates is packed in a manner as shown in Figs. 9 and 10 a magazine plate holder or film pack is set up. The casing is adapted to be applied to a camera in place of the ordinary plate holder. The casing 34 at its top on its inner face is provided with an offset 37 associating with the inclined portion 23 of the forward envelop and is adapted to act as a means to prevent such envelop from slipping out of the casing. The latter, 34, is furthermore provided with an interiorly-arranged strip of plush or a brush as indicated by the reference character 38. The plush or brush excludes the entrance of all dust or any foreign matter along with the entrance of an envelop, and also serves to prevent the light from entering the casing around the envelops. The package of envelops is in close contact with the brush. The casing 34 is provided with a strip 34ª for engagement with the camera.

An auxiliary front for the magazine is shown in Fig. 12 and which is indicated by the reference character 39. The front on one face is formed with a rearwardly-extending frame 40 open at one end, the frame being so positioned as to form a ledge 41. The front 39 is furthermore provided with an exposure opening 42. The function of the auxiliary front 39 is to adapt the magazine to various makes of cameras which vary some in the size and shape of their receptacles for plate holders from the cameras built especially for the magazine forming part of this invention. The front may be stamped from any suitable material of desired thickness and may be attached to the face of the magazine by any suitable means. In some instances the frame 40, which constitutes a guide and positioning means for the magazine, may be dispensed with, and if so the magazine, as before stated, is secured to the front in any suitable manner.

The magazine or package of envelops is provided with an index card or cover, as best shown in Fig. 11, and indicated by the reference character 43, and which has a depressed portion substantially concavo-convex in contour, as at 43ª constituting an offset extending across the envelop. The index card is formed from a strip of suitable material bent upon itself and having a tab 44 for receiving a suitable inscription as at 45. The sections of the card are provided with an index, as at 46, corresponding to the index numbers of the envelops. The lower edge of the card is concave or V-shaped, as at 47. The shape of the card conforms to the shape of an envelop and if desired the card may be provided with a velvet or plush back which facilitates the positioning of the card when slipping it into the casing 34. The index card can receive various inscriptions to indicate the character of the various kinds of plates or films carried by the various envelops or can receive other matter of reference for the operator.

The color screen 33 is in the form of a transparent sheet which is provided as a part of the equipment for the holder and is adapted to cover the exposure opening thereof and is a most convenient form of correctly exposing ortho-chromatic plates and eliminates the usual color screen attachment for the lens which may be lost, forgotten or misplaced and when present is usually in the way. The color screen 33 is always in a proper place and does not cause any inconvenience or is not an incumbrance. The envelop is provided with a suitable coating, for example wax or any other water-proof substance not injurious to the sensitized surface, or in lieu thereof a wax paper lining can be employed which will be of the same contour as the envelop. The contours of the envelops are alike, with the exception of the position of the tab 27, these tabs being so disposed as to be conveniently read, (for example as shown in Fig. 9). Owing to the fact that the envelops are of the same contour they are interchangeable one with the other anywhere within the package, and the same is true with the index which is also interchangeable with any one of the envelops in any part of the package.

The dark slide of each individual envelop being of thin material, is practically at the same focal distance from the lens as the plate covered by it and as the slide has a white front or face the image may be reflected on its face, in which case it serves as a focal plane under such conditions constituting a substitute for the usual ground glass in cameras where a peep-hole is provided for seeing the same. The color screen is used only in combination with ortho-chromatic plates. The inclined portions 22, 23 of the envelops not only act as a lock in a manner as hereinbefore stated, but also prevent light from entering between the envelops at the top side of the pack which is very desirable when the slide has been withdrawn.

After the plate has been inserted in the envelop the flap 31 is bent downwardly at the rear of the envelop and secured by the adhesive strip, 32$^a$. When the slide is to be removed so as to expose a plate in the envelop the strip is broken and when the flap 31 is bent upwardly the indication thereon denotes to the operator that the plate has not been exposed. The adhesive strip 32$^a$ also acts as a means to retain the flap in such position to facilitate the packing of a plurality of envelops. Furthermore as the flap is bent over the mouth 28 of the envelop it closes the mouth, consequently preventing the entrance of light and foreign substances to the interior of the envelop before the plate has been exposed or the slide removed.

When an envelop embodying my invention is to be employed in an ordinary plate holder camera the casing 34, with the envelops and the index in position therein, will be inserted in the camera. The envelop bearing the figure "1" upon its tab—that is the rear-most envelop of the pack will be drawn from the pack and re-inserted in front of the index card 43, with the flap 31 projecting upwardly. The picture will now be focused on the white face slide of the envelop No. 1. When it is desired to make the exposure the slide will be withdrawn and may be discarded. After the exposure has been made envelop number 2 is removed from the back of the camera and inserted in front of envelop number 1 from which the slide has been discarded, the plate therein having been exposed. Thereupon envelop number 2 becomes a light-tight slide fitting snugly over the exposure aperture of envelop number 1 and the slide becomes a focusing screen for the next picture, while at the same time envelop number 2 is in position so that upon the withdrawal of the slide from envelop number 2, the plate in said envelop may be exposed. After the plates have been exposed the package can then be taken from the camera into a dark room and the desired plate or plates developed and the envelops returned to the casing, or if after one plate has been exposed or two plates, or a greater number of plates, the package can be removed and the exposed plates developed. The natural expansion is sufficient to fill the space of the absent envelop during its transposing for any purpose, but preferably the well known arrangement of a spring in the back of the magazine will be utilized. Thus, if desired, the magazine may be operated so that one plate will always be ready for instantaneous exposure by the camera. When all the plates have been exposed the index card 43 should be withdrawn from the pack and inserted in front of the last plate holder used and consequently constitutes a cover for the last plate exposed, as well as closing the exposure opening of the casing 34. The casing 34 being light-tight and as each of the envelops is provided with a slide for the exposure opening thereof, the device as a whole may be transported and handled without danger of the plates or films being affected by the light and may constitute an article of manufacture and sale.

The invention is especially useful as a magazine package of cut films or a magazine package of plates, or a mixed package of films or plates for various purposes such as ortho chromatic, etc. which can be cheaply put up in this form for market. It provides a package in which each film or plate is separately inclosed in a light-tight envelop so that any single plate may be selected and exposed as well as developed independently and it is not subjected to any accidents of fogging, scratching, accidental exposure, deposits of dust, or other occurrences which so commonly happen to photographic plates prior to exposure and often without detection, and it affords a ready means whereby the manufacturer and user may both be protected as to age, character and make of plate, and above all it provides a magazine package of this character which can be made absolutely interchangeable with any standard make of plate holder, and furthermore it enables the entire package to be safely removed in daylight at any time so as to permit the development of any one plate in the package.

For a complete index system the envelop, the dark slide, the casing, a line on the index card and on the outer casing are numbered correspondingly.

What I claim is—

1. A pack comprising a series of photographic plate holders, each of said holders having an exposure opening and having its lower end inclining in opposite directions, and further provided with a removable slide adapted to cover said aperture.

2. A pack comprising a series of indexed photographic plate holders inter-engaging with each other, thereby preventing lengthwise shifting of the holders, each of said holders having an exposure opening provided with a removable flexible slide adapted to cover said aperture and further provided with a pocket to receive the plate, the walls of the pocket preventing lengthwise shifting of the plate.

3. A plate holder comprising an envelop having an exposure opening with an irregular-shaped lower edge, said envelop being provided with means to contain immovably a plate and having its bottom edge irregular-shaped, and a dark slide within the envelop for closing the opening.

4. A package of plate holders provided with off-set portions engaging with each other, each of said holders provided with an exposure opening and a cover for same, and means for holding said plate holders in a package.

5. A folded envelop plate holder provided with an exposure opening and a cover for same, said envelop adapted to contain a plate held laterally by the folded sides and provided with transversely extending offset portions engaging the plate to prevent lengthwise shifting thereof.

6. A plate holder consisting of an envelop having its back provided with a pair of transversely extending offset portions combined with side folds thereof to position a plate and a slide adapted to cover said plate and provided with means to indicate when the plate has not been exposed.

7. In combination a plurality of plate holders each consisting of an envelop having an exposure opening in its front and further provided at the front and rear at a point removed from the opening with a depressed portion inclining rearwardly and upwardly, the depressed portion of one envelop adapted to interengage with an adjacent envelop, thereby locking the envelops together.

8. A plate holder consisting of an envelop having an exposure opening and a slide for closing said opening, the outer face of said slide forming a reflecting surface for the image.

9. A plate holder consisting of an envelop having the back thereof provided with transversely extending offsets combined with co-operating side folds of the envelop to position a plate in said pocket and being adapted to abut against said offset portions whereby the plate is prevented from lengthwise shifting.

10. A plate holder consisting of an envelop having the back thereof formed with transversely extending off-sets to constitute a plate receiving pocket, said off-set constituting means to prevent longitudinal shifting of a plate, said holder provided with an exposure opening, a slide adapted to extend in said envelop and close said opening said slide having its outer face formed with a receiving surface for the image.

11. A magazine package comprising a series of index photographic plate holders each of said holders having an exposure opening and provided with a removable slide adapted to cover said opening, the outer face of said slide forming a reflecting surface for the image and said slide furthermore provided with means to indicate when the plate has not been exposed.

12. In combination an index photographic plate holder having an exposure opening and a pocket to receive a plate, the walls of said pocket so disposed as to prevent lengthwise shifting of the plate, said holder furthermore provided with a removable flexible slide for covering said opening, said slide having its outer face forming a reflecting surface for the image and furthermore provided with means to indicate when the plate has not been exposed.

13. A magazine pack for photographic purposes comprising a series of photographic plate holders having inclined interengaging portions, each of said holders having an exposure aperture and provided with a removable flexible slide adapted to cover the aperture, said slide having its outer face constituting a reflecting surface for the image.

14. A photographic plate holder having an exposure opening and its lower end inclining in opposite directions and further provided with a removable flexible slide adapted to cover said opening, said slide having its outer face constituting a reflecting surface for the image.

15. A magazine pack for cameras comprising a series of index photographic plate holders each having a concave lower edge, each of said holders having an exposure opening, the lower edge of said opening inclining in opposite directions, said holders furthermore provided with a removable flexible slide adapted to cover said aperture and further having a color screen.

16. A plate holder comprising an envelop provided with an exposure opening and a dark slide for same, the outer face of said slide constituting a reflecting surface for the image.

17. A plate holder comprising an envelop having side folds for positioning a plate laterally and formed at its rear wall with transversely extending off-set portions constituting means to prevent lengthwise shifting of the plate when the plate is mounted in the holder.

18. A plate holder comprising an envelop formed at its rear wall with transversely extending off-set portions constituting means to prevent lengthwise shifting of the plate when the plate is mounted in the holder, said plate holder furthermore provided near its top with a depressed portion inclining rearwardly and upwardly.

19. A magazine pack for cameras comprising a casing, a series of index photographic plate holders mounted therein, each of said holders having an exposure opening with the lower edge thereof angular, a removable flexible slide adapted to cover said opening and a color screen.

20. A magazine pack for cameras comprising a casing, a series of index photographic plate holders mounted therein, each having a concave lower edge, each of said holders having an exposure opening with the lower edge thereof angular, a removable flexible slide adapted to cover said opening and a color screen, combined with a camera front for supporting the casing.

21. A magazine plate holder comprising an open top casing provided with transverse offset portions and having an exposure opening, a pluraliay of separately removable plate holders contained therein, said plate holders having inclined portions adapted to interengage with one another and the offset portion within the casing for the purpose set forth and said plate holders being arranged in said casing in snug contact with each other and with one side of the casing, whereby light is prevented from entering between the separate holders.

22. A magazine plate holder comprising an open top casing having an exposure opening, a plurality of separately removable plate holders contained therein, said plate holders having inclined portions adapted to interengage with one another for the purpose set forth and said plate holders being arranged in said casing in snug contact with each other and with one side of the casing, whereby light is prevented from entering between the separate holders, each of said holders provided with a removable slide for said opening, the outer face of the slide constituting a reflecting surface for the image.

23. A plate holder consisting of an envelop provided with an exposure opening and a dark slide for same, a projecting tab upon said envelop, and a flap formed integral with the slide and provided with an inscription to indicate that the plate has not been exposed, the lower edge of said envelop being angular in contour.

24. A magazine pack for cameras comprising an outer casing provided with an offset portion a series of interchangeable plate holders having inclined interengaging portions.

25. A magazine pack for cameras comprising a series of index interchangeable photographic plate holders having inclined interengaging portions, and an outer casing provided with a similar engaging portion.

26. A magazine pack for cameras comprising an outer casing having an offset engaging portion a series of index interchangeable photographic plate holders having inclined interengaging portions, each of said holders having an exposure opening a detachable color screen for the same and provided with a removable flexible slide adapted to cover said opening.

27. A magazine pack for cameras comprising an outer casing provided with an engaging portion a series of interchangeable plate holders having inclined interengaging portions, each of said holders having an exposure opening and provided with a removable slide adapted to cover said aperture, a card having an outline similar to that of said envelops and having a similar inclined interengaging portion.

28. A magazine pack for cameras comprising a series of interchangeable and interengaging plate holders, each of said holders having an exposure opening with an angular edge and further provided with a removable slide adapted to cover said aperture, and a casing for snugly receiving said holders, said casing having an engaging means upon its inner face to prevent slipping of the envelops from the casing.

29. A plate holder consisting of an envelop having a portion thereof provided with a transversely extending offset combined with side folds of the envelop to position a plate having its lower edge inclined in opposite directions and further embodying an exposure opening, and a dark slide for closing said opening, said slide terminating at its top in a flap which extends over the mouth of the envelop and is secured to the rear thereof.

30. A plate holder consisting of an envelop having a part thereof provided with a transversely extending offset portion to form a pocket for a plate and further provided with an opening in the bottom to permit of the insertion of the plate in the pocket, said opening adapted to be sealed after the plate has been inserted, said envelop further provided with an exposure opening and a dark slide for closing said opening, said slide of greater length than said envelop and having the projecting end thereof secured to the body of the envelop.

31. A magazine plate holder comprising a casing having an engaging portion, an exposure opening and a series of resilient light tight envelops having inclined interengaging portions mounted in said casing and each of said envelops having an exposure opening and a dark slide for closing said opening, and an index card adapted to engage with said envelops in said casing.

32. A magazine plate holder comprising a casing having an exposure opening and a series of resilient light tight envelops having inclined interengaging portions mounted in said casing and each of said envelops having an exposure opening and dark slide for closing said opening, and an index card adapted to fit snugly in said casing, said casing provided with means at its top to engage with the inclined engaging portion of said envelops to prevent them from slipping out of the casing.

33. A magazine plate holder comprising a casing having an exposure aperture with an angular lower edge and a series of resilient interengaging light tight envelops each having an angular shaped lower edge, and a dark slide carried by each of the envelops.

34. A magazine plate holder comprising a casing having an exposure aperture with an angular lower edge and a series of resilient interengaging light tight envelops each having an angular shaped lower edge, a dark slide carried by each of the envelops, and an index card provided with an angularly-shaped lower edge and snugly fitting in said casing.

35. A plate holder comprising an envelop having an exposure opening with an angular shaped lower edge, said envelop having its bottom edge inclining in opposite directions, and a dark slide within the envelop for closing the opening.

36. A plate holder comprising an envelop having an exposure opening with an angular lower edge, said envelop having its bottom edge inclining in opposite directions, said envelop adapted to receive a plate and further provided with offset portions for maintaining the plate immovable in the envelop.

37. A magazine plate holder comprising a series of interchangeable envelops having inclined interengaging portions and each of said envelops further provided with a pocket for receiving a plate.

38. A plate holder envelop provided with an exposure opening and a cover therefor, the bottom edge of said envelop inclining inwardly in opposite directions with respect to each other.

39. In a package of light tight exposing envelops an outer casing the front of said casing having an exposure opening and said casing further provided with an auxiliary front.

40. A plate holder containing a sensitized plate; a removable reflecting surface for the image, said plate adapted to occupy the same focal plane during its exposure as that of the reflecting surface previous to its removal.

41. In combination a casing, a series of exposing envelops mounted in the casing and each of which constitutes a plate holder, said casing provided with an exposure opening, the lower edge of said envelop being angular.

42. A plate holder consisting of an envelop provided with an exposure opening and a removable cover for said opening, said cover composed of a plurality of sheets of material.

43. A magazine package of plate holders comprising a series of envelops each provided with an exposure opening, and a multiple piece dark slide for each of said exposure openings.

44. A photographic plate holder provided with a removable reflecting surface for the image and further containing a plate adapted to assume the same forward position as the reflecting surface when said reflecting surface is removed.

45. The combination of an individual sealed plate holder containing a sensitized plate, said holder further provided with an exposure opening, a cover for said opening, and a color screen located between the plate and the exposure opening.

46. An envelop plate holder provided with an exposure opening and a cover for same, the lower edge of said holder being concave.

47. An envelop plate holder provided with an exposure opening and a cover for same and containing a sensitized plate immovably positioned therein, also a color screen arranged to cover the sensitized face of said plate.

48. An envelop plate holder provided with an exposure opening and a cover for same and containing a sensitized plate, said cover designed as a focusing screen and said plate adapted to impersonate said focusing screen during exposure to the lens.

49. The combination of a number of individually light tight plate holders in a package, each holder provided with an exposure opening and a cover for same and containing a sensitized plate and a color screen, the plates in package adapted to be exposed selectively.

50. An individual light tight envelop plate holder of damp-proof material provided with an exposure opening and a cover for same, said holder designed to be collapsed in flat even contact with back and face of plate when in a package to the exclusion of light, moisture and air, the envelop having side folds and offset portions providing positioning means for a plate.

51. An outer casing containing a series of individual daylight plate holders, each of said holders provided with a transverse double bend, said holders adapted to interlock with each other in a package, said outer casing provided with a transverse off-set ridge adapted to interlock with the transverse bend of the holders.

52. An outer casing provided with an exposure opening and adapted to contain a series of individually light tight envelop plate holders each provided with an exposure opening and a dark slide for same, said outer casing provided with a mask for its exposing side.

53. A package of individual light tight envelop plate holders each provided with a transverse portion for interlocking with the adjacent holders when in a package and an index cover card of similar size and outline also provided with a transverse portion for interlocking with holders in a package.

54. An envelop plate holder provided with an exposure opening and a cover for same and adapted to contain a sensitized plate immovably positioned therein laterally by the side folds of the envelop, and positioned lengthwise by transverse offset portions.

55. In a photographic plate holder the combined focusing screen and dark slide.

56. A photographic plate holder designed to contain a sensitized orthochromatic plate immovably positioned therein and having an exposure opening provided with a color screen cover and air opaque cover.

57. A photographic plate holder provided with a sensitized plate immovably positioned therein and having an exposure opening provided with a flexible cover composed of a plural number of sheets of material.

58. A magazine of photographic plate holders combining an index-card of the contents of said magazine, each plate holder and index card having a concave lower edge.

59. A magazine plate holder composing an outer casing, a series of photographic plate holders and an index card of the contents each of said plate holders and card having a concaved lower edge.

60. A magazine plate holder for cameras embodying a series of removable plate containers each provided with a focusing screen cover, and means for substituting a plate in the position vacated by each focusing screen.

61. A photographic plate holder adapted to contain a plate and provided with a reflecting screen capable of being withdrawn from the holder, and means for positioning a plate in the plane previously occupied by the reflecting screen for exposure after such screen has been removed.

62. A plate holder for use interchangeably upon cameras, said holder being provided with a focusing screen, and means for positioning a plate in the proper focal plane.

63. A plate holder adapted for interchangeable use on cameras, said holder being provided with a slidable and removable focusing screen, and means for positioning a plate in the focal plane previously occupied by said screen after removal of the latter.

64. A photographic plate holder adapted to receive and position a photographic plate therein, said holder being provided with an exposure opening, and a detached color screen and dark slide therefor.

In testimony whereof I have hereunto set my hand in presence of two subscribing witnesses.

FRANK WHITNEY.

Witnesses:
V. CARLSON,
HOMER CAZEL.